United States Patent [19]

Wenman

[11] Patent Number: 4,804,353
[45] Date of Patent: Feb. 14, 1989

[54] SPROCKET WHEEL

[75] Inventor: George B. Wenman, Johannesburg, South Africa

[73] Assignee: Georich Services (Proprietary) Limited, Johannesburg, South Africa

[21] Appl. No.: 53,111

[22] Filed: May 21, 1987

[30] Foreign Application Priority Data

May 22, 1986 [ZA] South Africa ............... 86/3816

[51] Int. Cl.⁴ .............................................. F16H 7/06
[52] U.S. Cl. ...................................... 474/152; 474/155
[58] Field of Search ............... 474/152, 153, 155, 156, 474/210–212; 74/436, 575

[56] References Cited

U.S. PATENT DOCUMENTS 839,325  12/1906  Scott ..................................... 474/155
4,343,614  8/1982  Schulte ................................. 474/155

FOREIGN PATENT DOCUMENTS 2625019  12/1976  Fed. Rep. of Germany ...... 474/155

Primary Examiner—Thuy M. Bui
Attorney, Agent, or Firm—Sheldon & Mak

[57] ABSTRACT

A chain sprocket wheel (also known as a load sheave) 10 for a hoist is generally in the shape of an isosceles triangle in side view with arcuate crests 12 forming teeth. Each side 14 of the sprocket wheel has formed therein a pocket 16 which has one semi-circular end wall 18 at one end but has its rear end open so that the pocket 16 is not complete.

The pocket 16 are joined by "vertical" grooves 22 which passing through the teeth 12. The sprocket wheel 10 is used with a load chain having horizontal links 24a which are received in the pockets 16 and "vertical" links 22b which are received in the grooves 22.

3 Claims, 1 Drawing Sheet

SPROCKET WHEEL

BACKGROUND OF THE INVENTION

This invention relates to sprocket wheels for use with link chains.

The invention is concerned with a sprocket wheel of the kind comprising a plurality of pockets around its periphery separated respectively by upstanding teeth, each tooth having a groove therethrough in a plane substantially normal to the axis of the wheel. The chain is engaged on the sprocket wheel with alternate links respectively lieing in the pockets and standing up in the groove. Such a sprocket wheel is hereinafter called "a sprocket wheel of the kind set forth".

Sprocket wheels of the kind set forth are often used with lever or chain hoists (hereinafter referred to as "manual hoists") for transmitting a lifting or carrying force through a load chain. In known sprocket wheels of the kind set forth, the pockets are recessed in the circumferential surface of the wheel and are complete, i.e. the walls of the pockets consist of two side walls and two end walls which completely encompass the pocket. Thus the pockets are dimensioned to the links of the chain which in turn must be of precise and consistent dimensions as occurs in chains known as "graded chains".

In known sprocket wheels of the kind set forth used in manual hoists, there are four or five pockets separated respectively by four or five upstanding teeth.

SUMMARY OF THE INVENTION

According to one aspect of the invention there is provided a sprocket wheel of the kind set forth wherein each pocket has only one end wall so as to be able to receive therein links of different lengths.

Conveniently, the sprocket wheel comprises three pockets, thus each pocket is formed in one of the adjacent upstanding teeth and extends along the surface of the other adjacent tooth.

An embodiment of the invention will now be described by way of example with reference to the accompanying drawings.

DESCRIPTION OF THE PREFERRED EMBODIMENT

Figure 1:
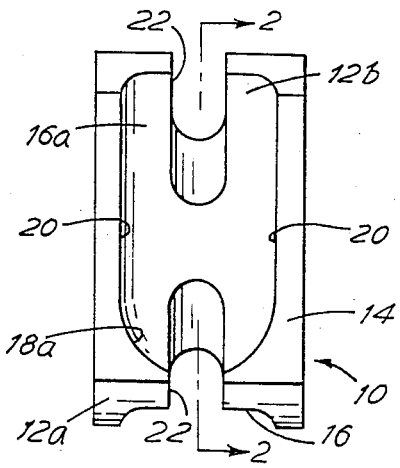
FIG. 1 is a side view of a sprocket wheel of the invention.

Referring now to the drawings, a chain sprocket wheel (also known as a load sheave) 10 of the invention is shown. It is generally in the shape of an isosceles triangle in side view with the crests 12 of the triangle arcuate and lieing on a circle. A central bore 13 passes through the sprocket wheel 10 so that it may be mounted on a shaft (not shown) with a suitable connection as known to those skilled in this art (such as a spline or key) so that the wheel and shaft rotate together.

In the sides 14 of the triangle are pockets 16. Each pocket is identical to pocket 16a which terminate at a semi-circular end wall 18a at one end near one of the adjacent crest 12a and has a pair of parallel side walls 20 extending from the ends wall 18. The side walls 20 and base extend through the other crest 12b. Thus the rear end of the pocket 16a (and both other pockets) is open and the pocket is not complete.

The pockets 16 are joined by grooves 22 lying between planes normal to the wheel axis 10a and formed through the crests 12 between the pockets 16, which crests 12 ends constitute as it were teeth between the pockets.

The sprocket wheel 10 is used with a load chain having conventional ovaloid alternate links 24a and 24b. The "horizontal" links 24a (i.e. the links lying in planes tangential to the sprocket wheel) are received in the pockets 16 and the portions of the "vertical" links 22b are received in the grooves 22.

Figure 2:
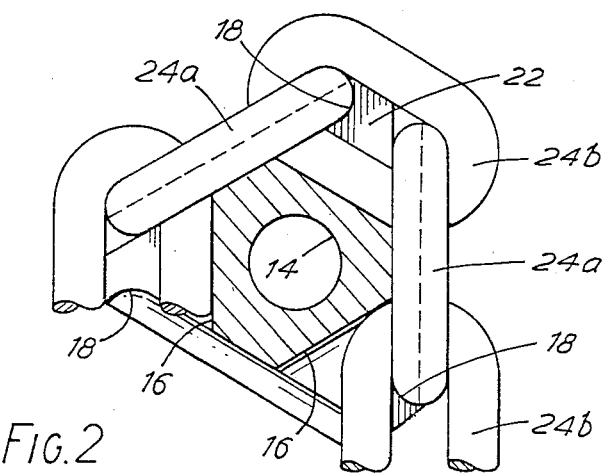
FIG. 2 is a section through the sprocket wheel, the section being taken on line 2—2 of FIG. 1 and with a link chain shown in position.
Figure 3:
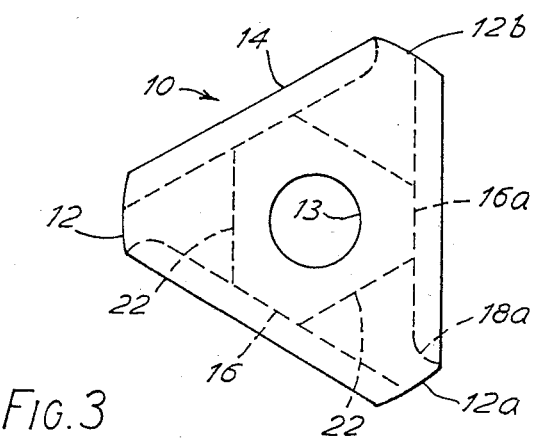
FIG. 3 is a end view of the sprocket wheel.

The sprocket wheel 10 is used in a hoist or similar arrangement where the load is applied to the load chain from one direction only. It, the sprocket wheel 10, is arranged so that the closed end walls 18 are at the load side of the chain. The end walls 18 will thus react against the ends of the links in the direction it tends to move under its load (i.e. clockwise in FIG. 2).

Because each pocket 16 is open ended, it can accomodate horizontal links the axial length of which varies within limits. The variation that can be accomodated is about 0.5 mm to 0.7 mm in conventional low strength chains i.e. up to 3 tonne chains. This means that the sprocket wheel can be used with load chains which are not made to very high tolerances as to their axial length i.e. are not "graded" and which consequently are very much more economical to manufacture than such "graded" chains.

The chain sprocket 10 of the invention can be made as robust as desired and that it works very satisfactorily in practice.

The invention is not limited to the precise constructional details hereinbefore described and illustrated in the drawings.

I claim:

1. A sprocket wheel comprising pockets around its periphery, each said pocket having two ends, one of which ends is formed by an end wall defined by an upstanding tooth, said pockets being separated from one another by said teeth each tooth having a groove therethrough in a plane substantially normal to the axis of the wheel, wherein the other end of each pocket is open so that each said pocket is able to receive therein links of different lengths.

2. A sprocket wheel as claimed in claim 1 wherein the sprocket wheel comprises three pockets, each pocket being formed in one of the adjacent upstanding teeth and extending along the surface of the other adjacent tooth.

3. A sprocket wheel which is generally in the shape of an equilateral triangle and which comprises three pockets around its periphery, said pocket being located respectively on said sides and having two ends, one of which ends is formed by an upstanding tooth, each tooth having a groove therethrough in a plane substantially normal to the axis of the wheel, said teeth separating the pockets from one another, wherein the other end of each pocket is open so that the pocket may accommodate therein links of different lengths.

* * * * *